(12) United States Patent
Loibl

(10) Patent No.: US 10,479,062 B2
(45) Date of Patent: Nov. 19, 2019

(54) HEATABLE ROLLER FOR LAMINATORS AND LAMINATOR WITH THE HEATABLE ROLLER

(71) Applicant: Monolith GmbH Buerosysteme, Essen (DE)

(72) Inventor: Bernd Loibl, Klettgau (DE)

(73) Assignee: Monolith GmbH Buerosysteme, Essen (DE)

( * ) Notice: Subject to any disclaimer, the term of this patent is extended or adjusted under 35 U.S.C. 154(b) by 269 days.

(21) Appl. No.: 15/588,662

(22) Filed: May 7, 2017

(65) Prior Publication Data

US 2017/0274637 A1  Sep. 28, 2017

Related U.S. Application Data

(63) Continuation of application No. PCT/EP2016/076746, filed on Nov. 4, 2016.

(30) Foreign Application Priority Data

Dec. 22, 2015  (DE) .................... 20 2015 107 028 U

(51) Int. Cl.
  *B32B 37/06* (2006.01)
  *B32B 37/00* (2006.01)
(52) U.S. Cl.
  CPC .......... *B32B 37/0053* (2013.01); *B32B 37/06* (2013.01); *B32B 2037/0061* (2013.01)

(58) Field of Classification Search
  CPC ........................... B32B 37/0053; B32B 37/06
  See application file for complete search history.

(56) References Cited

U.S. PATENT DOCUMENTS

| 5,203,756 | A | 4/1993 | Taguchi et al. |
| 2003/0178407 | A1 | 9/2003 | Yue |
| 2004/0218156 | A1 | 11/2004 | Johnson |
| 2013/0042979 | A1* | 2/2013 | Loibl ................ B32B 37/0053 |
| | | | 156/583.1 |

FOREIGN PATENT DOCUMENTS

| DE | 4103867 A1 | 11/1991 |
| DE | 20100328 U1 | 3/2001 |
| DE | 202009000903 | 3/2010 |
| DE | 202011052223 U1 | 12/2012 |
| DE | 20 2011 052 223 | * 2/2013 ............ B32B 37/10 |
| WO | WO2006015569 A1 | 2/2006 |

\* cited by examiner

*Primary Examiner* — Philip C Tucker
*Assistant Examiner* — John Blades
(74) *Attorney, Agent, or Firm* — Von Rohrscheidt Patents

(57) ABSTRACT

A heatable roller, in particular a laminating roller for laminators, the heatable roller including a roller body including a cylindrical outer surface and defining a longitudinal axis; an elastic roller cover which is supported at the outer surface of the roller body; and a rod shaped heating module which is arranged in a central axial pass through opening of the roller body and which is connected at least torque proof with the roller body, characterized in that the roller body includes a cylindrical roller tube which defines a central axial pass through opening in which the rod shaped heating module is arranged.

2 Claims, 5 Drawing Sheets

HEATABLE ROLLER FOR LAMINATORS AND LAMINATOR WITH THE HEATABLE ROLLER

RELATED APPLICATIONS

This application is a continuation of International Application PCT/EP 2016 07 67 46 filed on Nov. 4, 2016, claiming priority from German utility model application DE 20 2015 107 028.4 DE10 filed on Dec. 22, 2015. Both of which are incorporated in their entirety by this reference.

FIELD OF THE INVENTION

The invention relates to a heatable roller, in particular a laminating roller for laminators, the laminating roller including a roller body including a cylindrical outer surface and defining a longitudinal axis, an elastic roller cover that is supported at an outer surface of the roller body and a rod shaped heating module which is arranged in a central axial pass through opening of the roller body and connected with the roller body at least torque proof.

BACKGROUND OF THE INVENTION

In order to protect sheet material, in particular valuable documents it is known to weld the sheet material together with a laminating foil. Thus, the sheet material is inserted between two foil sheets forming a laminating foil, wherein the sheet material and the foil sheets are then jointly transported through the laminator. The foil sheets can also be provided as a laminating foil pouch wherein the two foil sheets are connected with each other at least at one side edge. Laminating foils of this type are known for example from DE 201 00 328 U1. It is characteristic for laminating foils that they are configured as composite foils where a transparent clear foil, e.g. made from polyester or polypropylene is provided with a heat sensitive glue layer on an inside wherein the glue layer can be made for example from EVA (ethylene vinyl acetate copolymer).

In the non-industrial sector, this means in the office and private sector laminators are typically used that are configured as table top units. Laminators of this type are known from DE 20 2009 000 903 U1. They typically have the same basic configuration with a unit housing in which a laminating unit is arranged. A pass through channel extends between an infeed opening on one side and an outlet opening on another side of the unit housing wherein the laminating unit is associated with the pass through channel. The laminating unit typically includes a pair of rollers, sometimes also several pairs of rollers which are respectively made from two laminating rollers that are arranged on top of each other forming a laminating gap. Thus, the laminating gap is configured so that the combination of sheet material and laminating foil in the laminating gap is subjected to a substantial pressure.

In hot laminators one of the laminating rollers, typically both laminating rollers are heated. When a combination of the sheet material and the laminating foil passes through the combination is additionally heated in the laminating gap. This renders the glue layer of the laminating foil gluable and provides a connection of the foil sheets with each other and with the sheet material to be encased by welding. The temperature during hot lamination is thus set so that a portion of the foil sheets which is made from the clear foil is not impaired by the heat impact.

Typically rod shaped heating modules are used for heating the laminating rollers. A laminating roller is known for example from DE 20 2011 052 223 U1 wherein a heating module is provided from a PTC (positive temperature coefficient) heating rod that is enveloped by an insulating foil and installed in a central axial pass through opening of a heat conducting and temperature resistant roller element of the laminating roller. However for example also resistance heating rods are known in the art. A PTC heating rod has temperature resistance properties which provide decreased heating power with increasing temperature, this means the PTC heating rod is substantially self-regulating. In PTC heating rods of this type therefore external control or regulation or overheating protection can be substantially omitted. It is another advantage of the heating rods of the type recited supra that laminating foils with different thickness can be laminated with the same temperature since the PTC heating rod regulates the thermal energy according to the heat requirement self-acting this means less thermal energy is provided for a thinner foil, than for a thicker foil.

In the laminating roller that is known from DE 20 2011 052 223 U1 the roller body is made from two roller core elements which are assembled to form the roller body. Assembling the two components does not provide a perfectly cylindrical outer surface of the roller body without edges or protrusions. Such surface, however, would be necessary for example to pull a hollow cylindrical hose as a roller cover onto the roller body. When a hose is pulled onto the roller body that is known from DE 20 2011 052 223 U1 then wedging of the hose at edges or protrusions at the outer surface of the roller body occurs quite frequently. For this reason, among others, applying a roller cover is often omitted in known devices. Instead the roller body is encased with the material of the roller cover after joining. Since an accurate and even encasement through injection molding is not always possible scrap rates in an order to magnitude of 17% occur during the production of laminating rollers. It is difficult in particular to apply a roller cover with constant thickness through injection molding when there are edges or protrusions at an outside of the roller body.

BRIEF SUMMARY OF THE INVENTION

Thus, it is an object of the invention to provide a heatable roller as described supra with an alternatively configured roller body which facilitates reducing the scrap rate during production of heated rollers of this general type and thus provides cost savings.

The object is achieved by a heatable roller, in particular a laminating roller for laminators, the heatable roller including a roller body including a cylindrical outer surface and defining a longitudinal axis; an elastic roller cover which is supported at the outer surface of the roller body; and a rod shaped heating module which is arranged in a central axial pass through opening of the roller body and which is connected at least torque proof with the roller body, characterized in that the roller body includes a cylindrical roller tube which defines a central axial pass through opening in which the rod shaped heating module is arranged.

Thus, it is a core idea of the invention to use a tube with an exactly cylindrical outer surface as an element of the roller body. The cylindrical roller tube is a one piece component. The risk that is known in the art that different components of the roller body move relative to each other or have fabrication tolerances so that an exactly cylindrical outer surface of the roller body cannot be provided does not exist for the roller body that is configured according to the invention.

The invention also facilitates to pull a hose made from a rubber elastic material onto the roller tube in order to form a roller cover, advantageously the hose is made from silicone elastomeric material, in particular with a radially inward oriented preload in order to provide good heat transfer from the roller tube to the hose. The roller tube can also be pushed into a hose whose internal diameter is slightly greater than an internal diameter of the roller tube. Subsequently the hose can be shrunk similar to a shrink hose that is used for electrical applications so that the hose is fixated axially and against rotation on an outer surface of the roller tube. This way a defect rate in the manufacture of laminating rollers can be significantly reduced.

Alternatively it is also possible to spray on and/or bake on a rubber elastic material, advantageously a silicone elastomeric material to form a roller cover.

Advantageously the roller tube is made from steel, aluminum copper or an alloy thereof in order to provide optimum heat conductivity. The outer diameter of the roller tube that is enveloped with an elastic roller cover configured as a cylindrical sleeve which corresponds to an outside diameter of the heatable roller is advantageously 13-19 mm, in particular 16 mm. The roller cover, however can also include a cambered outer surface. During lamination the laminating rollers are pressed together and a slightly convex roller cover can provide compensation.

Advantageously the rod shaped heating module is fixated in the roller tube by a press fit, thus advantageously so that at least a portion of the outer surfaces of the rod shaped heating module contacts the inner surface of the pass through opening under a pressure preload. This provides particularly good heat transfer through heat conduction.

Advantageously, the pass through opening of the roller tube has a circular cross section. In this case any commercially available cylindrical tube which has sufficient heat conductivity and suitable dimensions can be used as a roller tube. In particular a rod shaped heating module with circular or square cross section without a preferred orientation can be axially inserted into the pass through opening of the tube, However it is also possible to configure the pass through opening polygonal. Correspondingly configured surfaces at an outside of the rod shaped heating module then have the advantage that the heating module can be connected with the tube in a form locking manner. Thus, for a corresponding configuration the rod shaped heating module can also be directly supported in the roller tube.

According to an embodiment of the invention the roller body includes a heat conducting roller core with a cylindrical or essentially cylindrical outer surface, wherein the roller body is configured as a solid material core with a central receiving channel adapted to the cross section of the rod shaped heating module and enveloping the cross section without a gap there between wherein the rod shaped heating module is advantageously received with a press fit on all sides in the receiving channel. Thus, the rod shaped heating module is arranged within a receiving channel enveloping the rod shaped heating module gap free, wherein the roller core is otherwise configured as a solid material core. Advantageously the roller core is made from metal, advantageously aluminum, copper or an alloy thereof or from another metal alloy like e.g. steel. Due to its low weight and good heat conductivity aluminum, or in particular an aluminum alloy is particularly suitable. This yields an optimum heat transfer from the rod shaped heating module onto the surface of the heatable roller. The loss inducing heating of air is avoided by this configuration. Due to optimum heat conduction to outsides of the heatable roller the rod shaped heating module can be operated with a significantly reduced temperature, e.g. with temperatures between 140° C. to 145° C., compared with an arrangement where a considerable amount of air is heated up. The lower operating temperatures of the rod shaped heating module cause significantly reduced energy consumption. The heatable rollers can furthermore be fabricated with greatly reduced outside diameter so that a housing of the operating unit can be configured smaller. The term "gap free" according to the instant invention relates to a size of the receiving channel relative to dimensions of the rod shaped heating module where a small clearance is provided at the most between the rod shaped heating module and walls of the receiving channel, advantageously mutual contact is provided so that heat transfer is essentially performed by heat conduction.

Advantageously the rod shaped heating module should be received in the receiving channel with a press fit on all sides, this means in a manner so that at least a portion of the outsides of the rod shaped heating module contacts at least a portion of the insides of the receiving channel under a pressure preload. This facilitates particularly good heat transfer through heat conduction. Since the roller body of the roller that is heatable according to the invention does not only include a roller tube but also a roller core it is provided through respective sizing of the receiving channel to integrate heating modules with different dimensions.

Advantageously the roller core is axially inserted into the pass through opening of the roller tube together with the rod shaped heating module and connected torque proof and axially fixated in particular by a press fit with the roller tube. When an outer diameter of the cylindrical roller core corresponds to an inner diameter of the cylindrical pass through opening of the roller tube or the diameters are at least essentially identical, the roller core can be cooled for example, and/or the roller tube can be heated in order to obtain a press fit after an insertion into the pass through opening and a cooling or heating of the components. The roller core can certainly also be fixated in the roller tube in any other suitable way. Since the roller core is inserted into the roller tube together with the rod shaped heating module different types of heating modules can be inserted into a particular predetermined roller tube according to customer specifications and requirements of a particular device. This facilitates a particular high level of flexibility.

Advantageously the roller core is divided into two roller core sections in a longitudinal direction forming a separation gap that intersects the receiving channel. This facilitates inserting a rod shaped heating module since the heating module is insertable in this case transversal to its longitudinal axis into the receiving channel which is particularly advantageous when as stated supra a fixation of the rod shaped heating module shall be provided with a press fit. Thus, a separation gap intersecting the receiving channel is also a separation gap which extends along one of the insides of the receiving channel.

The roller core sections can contact the rod shaped heating module under a preload. Thus, faces of the roller core sections that are oriented towards each other can be arranged opposite to each other offset by the separation gap. This way the rod shaped heating module is clamped. It is also possible that the separation gap is closed starting with a particular preload so that the face ends contact each other. However, also embodiments are conceivable where the face ends of the roller core sections contact each other in general in order to clamp the rod shaped heating module in this manner. This can be performed through a bolted connection. However, it is easier to provide at least one interlocking device through which the two roller core sections are clamped together by mutual compression.

In order to obtain a defined positioning of the roller core sections relative to each other the roller core sections can engage each other in a form locking manner so that they guide each other in the transversal direction. This can certainly also be performed in the longitudinal direction.

Advantageously the heating module includes a heating rod, in particular a PTC heating rod which is enveloped by a heat conducting electrically insulating foil. In particular a PTC heating rod is advantageous since it has temperature resistant properties which cause a reduced heating power for increased temperatures. Thus, also other heating rods, like e.g. resistance heating rods can be used. Advantageously the heat conducting electrically insulating foil is a carbon foil or a filled elastomeric foil like e.g. a polyester based, silicone based or silicone free filled elastomeric foil. For example a self- adhesive carbon heat conducting foil can be used whose glue layer is electrically conductive. A silicone based foil is for example a silicone elastomeric material which is filled with heat conductive ceramic materials. WO 2006 015 569 A1 also discloses heat conducting foils made from a silicone free elastomeric aliphatic polyurethane or made from polydimethylsiloxane which are filled with corresponding filling materials. Advantageous foil thicknesses are in a range of 0.1 mm to 5 mm. Often foil thicknesses in a range of 0.1 mm to 0.3 mm are sufficient.

Advantageously the PTC heating rod includes a plurality of PTC heating elements that are arranged along the longitudinal axis behind one another and which are in particular cuboid and which are enveloped on both longitudinal slides by metal electrodes. The metal electrodes are advantageously flat electrodes thus plates that are loaded with electrical current which advantageously extend over the length of the PTC heating element. The PTC heating rod is advantageously made from a ceramic material with barium nitrate as a base material.

According to an alternative embodiment of the invention the metal electrodes have a trapezoid cross section so that the PTC heating element is essentially shaped as a cuboid whose longitudinal edges are beveled and which contact an inner surface of the roller tube. In particular when the pass through opening of the roller body is defined by plural flat surfaces the beveled longitudinal edges can contact corresponding surfaces of the pass through opening. In case of a cylindrical pass through opening it can be useful when the longitudinal edges of the cuboid are rounded, wherein a curvature radius of the longitudinal edges should correspond to an inner radius of the pass through opening.

In this case free spaces are advantageously formed in a portion of the metal electrodes between the PTC heating rod enveloped by the foil and the inner surface of the roller tube, wherein the free spaces are respectively filled completely by a circular segment shaped support element, in particular made from steel, aluminum, copper or an alloy thereof. Thus, an amount air arranged in the pass through opening is reduced and better heat transfer from the PTC heating rod to the roller tube is facilitated. Additionally a press fit of the rod shaped heating module within the roller tube is augmented.

In an alternative embodiment where the roller tube has a circular inner cross section the metal electrodes have a circular segment shaped or substantially circular segment shaped cross section so that the PTC heating rod has an essentially cylindrical outer shape and the foil contacts the inner surface of the roller tube at least in the portion of the metal electrodes. This provides good heat transfer and a strong press fit of the rod shaped heating module within the roller tube.

Advantageously the PTC heating rod is configured so that the metal electrodes of the PTC heating rod that are provided on opposite longitudinal sides of the PTC heating elements are respectively only positioned in one of the two roller core sections and thus on opposite sides of the separation gap. Among other things this provides particularly effective heat dissipation in the portion of the metal electrodes since no separation gap is arranged in this portion of the roller core.

The object of the invention recited supra is achieved according to the invention also by a laminator for hot laminating sheet material and a laminating foil, the laminator including a unit housing through which a pass through channel for passing through a combination of sheet material and laminating foil extends in which a laminating unit with at least one pair of opposing laminating rollers is arranged so that a laminating gap is left clear between the laminating rollers, wherein at least one of the two laminating rollers of the pair is a heatable roller according to the invention. Advantageously also the two laminating rollers can be rollers that are heatable according to the invention. It is appreciated that also plural pairs of laminating rollers can be provided, wherein the laminating rollers can respectively be rollers that are heatable according to the invention.

Thus, the heatable roller described supra provides a heatable roller with an alternatively configured roller element for the first time which facilitates reducing a scrap rate during production of the heatable rollers and thus cost savings.

BRIEF DESCRIPTION OF THE DRAWINGS

Additional features and advantages of the instant invention are now described based on an embodiment of the laminator according to the invention and three embodiments of the heatable roller according to the invention with reference to the appended drawing figures.

DETAILED DESCRIPTION OF THE INVENTION

Figure 1:
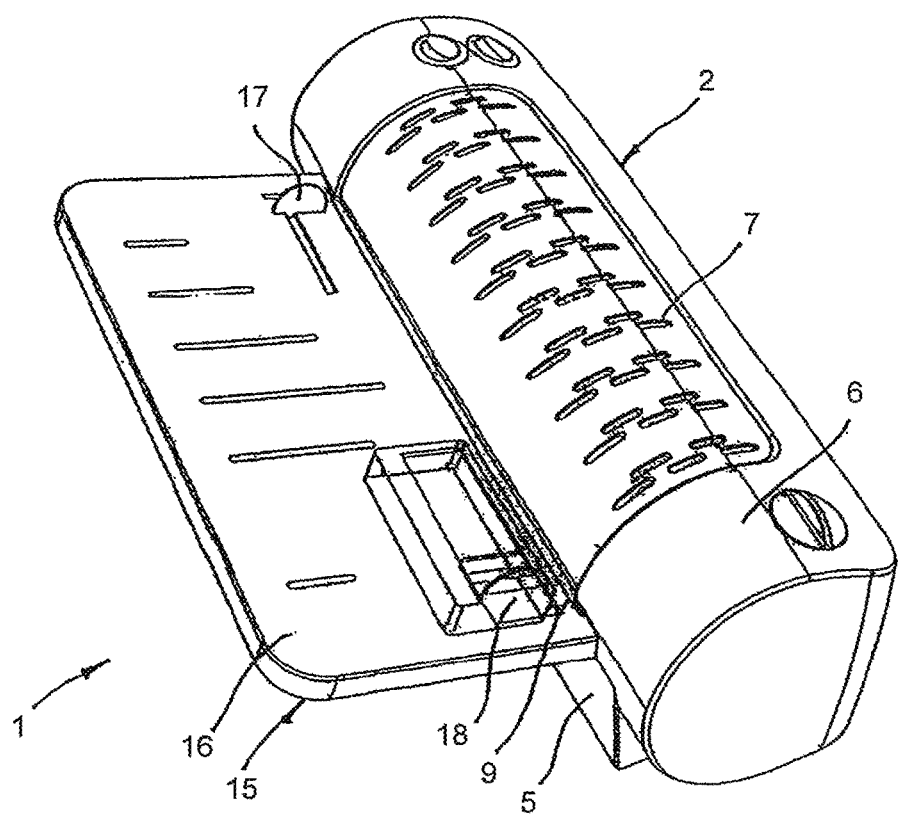
FIG. 1 illustrates a slanted view of a back side of an embodiment of the laminator according to the invention.
Figure 2:
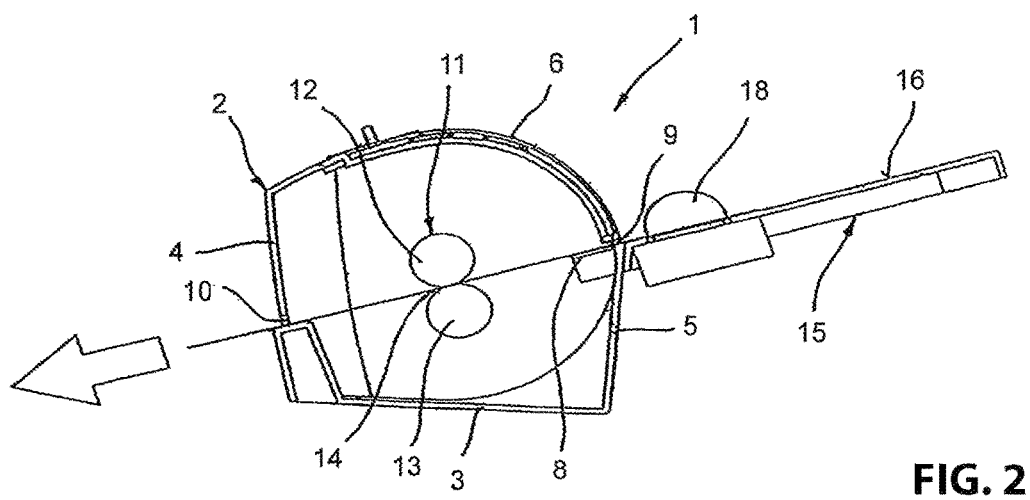
FIG. 2 illustrates the laminator according to FIG. 1 in cross sectional view.

The laminator 1 illustrated in FIGS. 1 and 2 includes a housing 2 with a flat housing base 3, a front wall 4, a rear wall 5 and an arc shaped upper wall 6 connecting the front wall 4 and the rear wall 5. The upper wall 6 is provided with a plurality of cooling slots, designated in an exemplary manner with the reference numeral 7.

A downward slanted pass through channel 8 extends from the rear wall 5 to the front wall 4 through the housing 2 with a width so that DIN A4 sheet material can be passed through transversally. The pass through channel 8 is defined on the inlet side by a feed opening 9 in the rear wall 5 and an outlet opening 10 in the front wall 4.

A laminating unit 11 is arranged approximately in a center of the pass through channel 8 wherein the two laminating rollers 12, 13 of the laminating unit are visible that are arranged on top of each other and with their rotation axes parallel to each other. The laminating rollers 12 extend over an entire width of the pass through channel and form a laminating gap 14 between each other. The laminating rollers 12, 13 are heated which is described in more detail in FIGS. 3-9. The laminating rollers also form a portion of a transport arrangement which includes a drive with an electric motor which is not illustrated in more detail which synchronously drives the two laminating rollers 12, 13 during the laminating process, thus drives the upper laminating roller 12 clockwise and the lower laminating roller 13 counter clockwise. The circumferential speeds are identical.

A sheet support 15 is arranged at the rear wall 5 wherein a top side 16 of the sheet support 15 adjoins a bottom side of the pass through channel 8 flush and is inclined in the same direction as the pass through channel 8 itself. Adjacent to the feed opening 9 two support bars 17, 18 protrude beyond a top side 16 of the sheet support 15 wherein the support bars are arranged opposite to each other and are movable counter acting through a mechanical coupling so that a center of the distance between both support bars remains constant during an adjustment. Thus a distance of the support bars 17, 18 is adaptable to the format of the combination of laminating foil and sheet material that is to be laminated so that both side edges of this combination are run through the support bars 17, 18 when inserted into the pass through channel 8 and the laminating foil runs into the pass through channel 8 in a centric manner.

Figure 3:
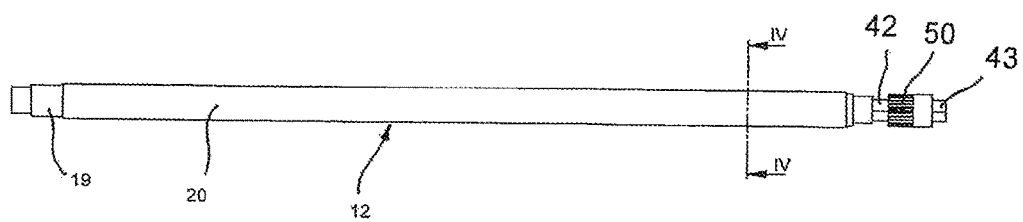
FIG. 3 illustrates a side view of a laminating roller of the laminator according to the invention according to FIGS. 1 and 2 according to a first embodiment.
Figure 4:
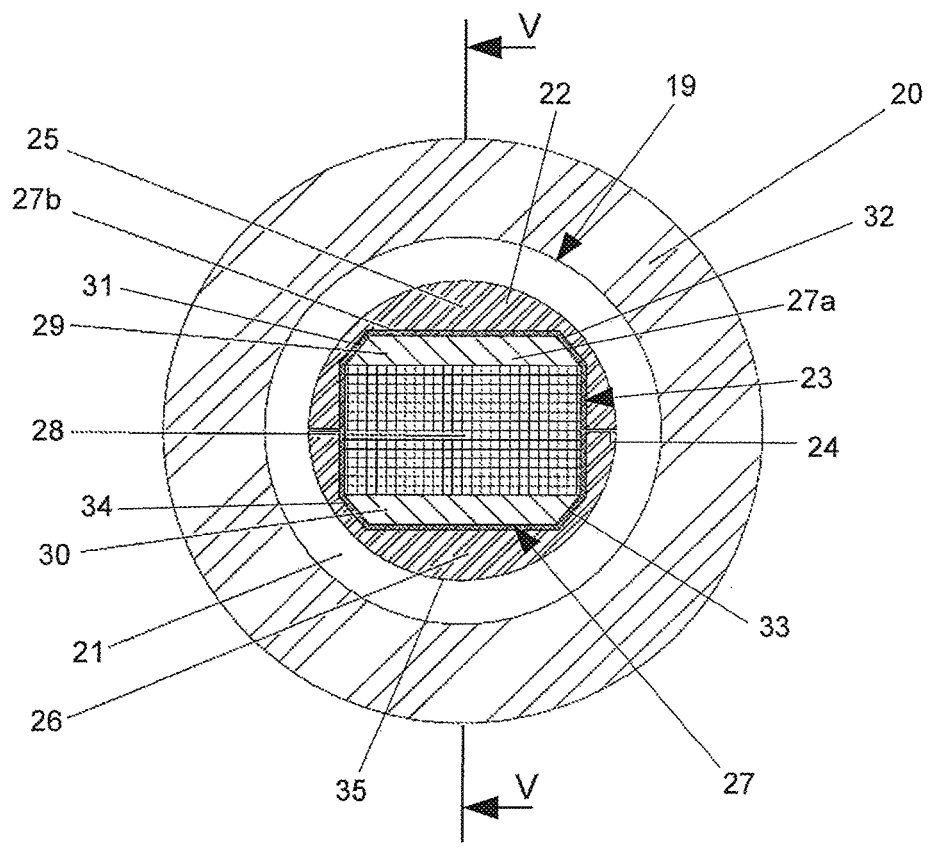
FIG. 4 illustrates a cross section of the laminating roller according to FIG. 3 in the plane IV-IV.
Figure 5:
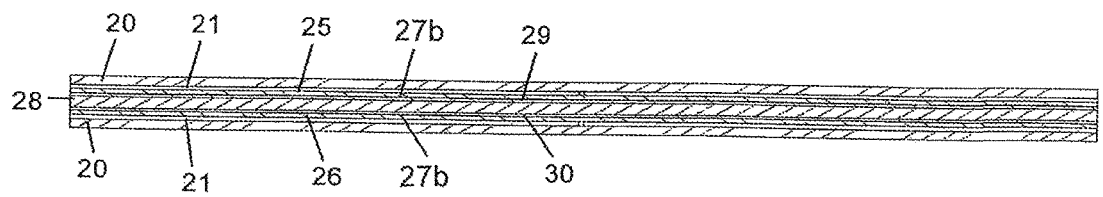
FIG. 5 illustrates a cross section through the laminating roller according to FIG. 4 in the plane V-V.

The laminating roller 12 illustrated in FIGS. 3, 4, and 5 and moved out of from the laminating unit 1 includes a roller element 19 which includes a cylindrical outer surface and defines a longitudinal axis L.

An elastic roller cover 20 s supported at an outer surface of the roller body 19. The roller cover 20 in this embodiment is a hose pulled onto the roller body 19 and made from a silicone elastomeric material. Alternatively the roller cover 20 can also be injection molded onto the roller body 19.

The roller body 19 includes a hollow cylindrical roller tube 21 made from a heat conducting material and a heat conducting roller core 22 with a substantially cylindrical outer surface. Thus, the roller tube 21 and the roller core 22 are advantageously made from metal, advantageously aluminum, copper or an alloy thereof or from another metal alloy like e.g. steel The roller core 22 in the illustrated embodiment is configured as a solid material core with a central receiving channel 23 that has a substantially rectangular cross section and which extends over an entire length of the roller core 22. Forming a separation gap 24 intersecting the receiving channel 23 the roller core 22 is longitudinally divided into two roller core sections 25, 26. The separation gap 24 extends over an entire length of the roller core 22. In an embodiment that is not illustrated herein the separation gap 24 can also have plural steps which support the two roller core sections 25, 26 in a transversal direction relative to each other. Due to the separation gap 24 the outer surface of the roller core 22 is designated as essentially cylindrical.

A rod shaped heating module 27 is inserted into the receiving channel 23, wherein the heating module includes a PTC heating rod 27*a* which is enveloped by a heat conducting electrically insulating foil 27*b* configured as a carbon foil. In other embodiments the foil 27*b* can also be a filled elastomeric foil like a polyester based, a silicone based, or a silicone free elastomeric foil or another known electrically insulating heat conducting foil. In the illustrated embodiment the PTC heating rod is made from ceramic material with barium nitrite as a base material. The PTC heating rod includes a plurality of cuboid PTC heating elements 28 that are arranged behind one another along the longitudinal axis L wherein the PTC heating elements are enveloped on both sides by metal electrodes 29, 30. FIG. 5 does not illustrate the plurality of PTC heating elements 28. The metal electrodes 29, 30 include a trapezoid cross section so that the PTC heating element 27*a* essentially has an overall shape of a cuboid, whose longitudinal edges 31, 32, 33, 34 are beveled. The receiving channel 23 of the roller core 22 is adapted to the cross section of the rod shaped heating module 27 so that the rod shaped heating module 27 is enveloped by the insides of the receiving channel 23 closely so that insides of the receiving channel 23 contact the foil 27*b*. Thus, the rod shaped heating module 27 is received in the illustrated embodiment in the receiving channel 23 with a press fit.

The rod shaped heating module 27 is arranged in the receiving channel 23 so that the two roller core sections 25, 26 are separated from each other initially so that the rod shaped heating module 27 is insertable in one of the two roller core sections 25, 26. Then the other of the two roller core sections 25, 26 is applied. The two roller core sections 25, 26 then contact the rod shaped heating module 27, wherein faces of the roller core sections 25, 26 oriented towards each other are offset from each other through the separation gap 24.

As can be derived from FIG. 4 the PTC heating rod 27*a* is oriented so that metal electrodes 29, 30 of the PTC heating rod 27*a* provided on opposite longitudinal sides of the PTC heating elements 28 are respectively positioned in only one of the two roller core sections 25, 26 and thus on opposite sides of the separation gap 24.

The roller core 22 is axially inserted together with the rod shaped heating module 27 into the central axial pass through opening 35 with a circular cross section of the roller body 19 and connected by a press fit with the roller tube 21 torque proof and axially fixated.

Figure 6:
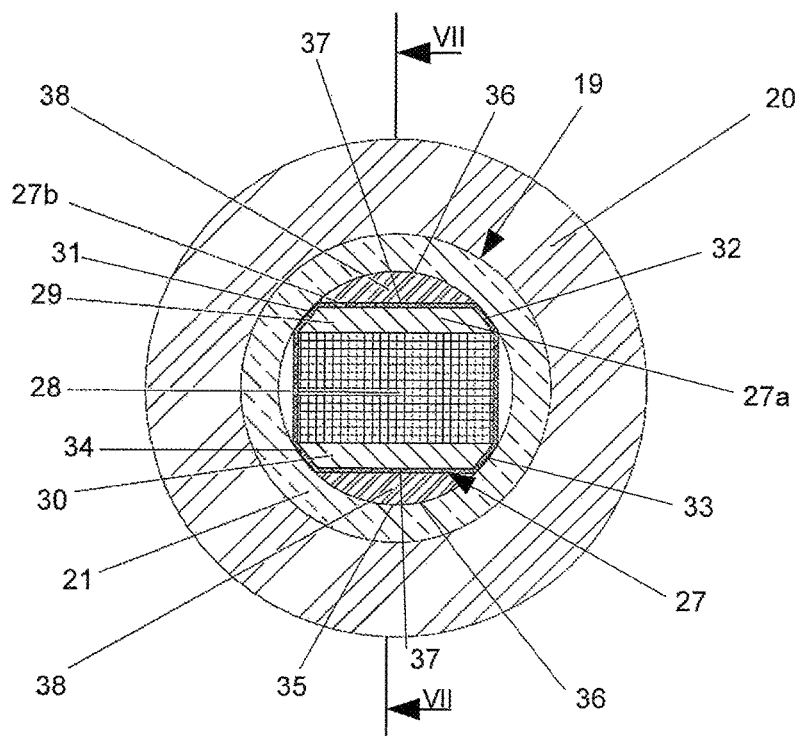
FIG. 6 illustrates a cross section of a laminating roller according to invention of the laminator according the invention according to FIGS. 1 and 2 according to a second embodiment.
Figure 7:
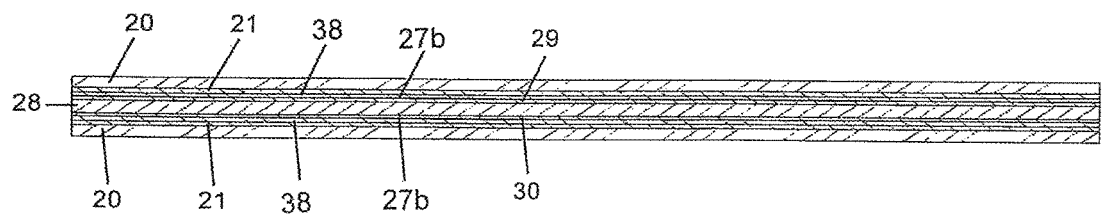
FIG. 7 illustrates a cross section of the laminating roller according to FIG. 6 in the plane VII-VII.

FIGS. 6 and 7 illustrate a second embodiment of the laminating roller 12 according to the invention. Also here the roller element 19 includes a roller tube 21 which includes a cylindrical outer surface and a central axial pass through opening 35 with a circular cross. Section. A rod shaped heating module 27 is axially inserted into the pass through opening 35 wherein the rod shaped heating module corresponds to the rod shaped heating module 27 which was already described with reference to FIGS. 4 and 5. Differently from the first embodiment the beveled longitudinal edges 31, 32, 33, 34 of the cuboid do not contact inner surfaces of the receiving channel 23, but an inner surface 36 of the roller tube 21. Furthermore the laminating roller 12 according to the second embodiment operates without a roller core 22. Instead free spaces are formed in the portion 37 of the metal electrodes 29, 30 between the PTC heating rod 27*a* enveloped by the foil 27*b* and an inner surface 36 of the roller tube 21 wherein the free spaces are respectively filled completely by a circular segment shaped support element 38. Similar to the roller core 22 from FIGS. 4 and 5 also the support element 38 is advantageously made from steel, aluminum, copper or alloys thereof. With reference to additional features and advantages reference is made in particular to the description of FIGS. 4 and 5.

Figure 8:
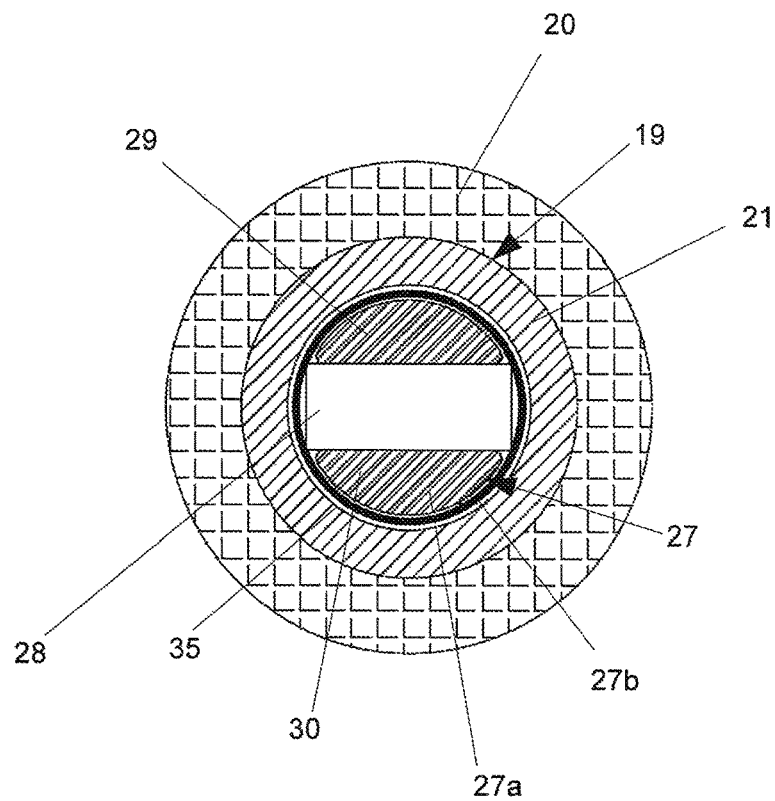
FIG. 8 illustrates a cross section through a laminating roller according to the invention of the laminator according to the invention according to FIGS. 1 and 2 according to a third embodiment.

FIG. 8 illustrates a third embodiment of the laminating roller 12 according to the invention. In this case the metal electrodes 29, 30 include a substantially circular segment shaped cross section so that the PTC heating rod 27a has an essentially cylindrical outer shape and the foil 27b contacts the inner surface 36 of the roller tube 21 at least in the portion of the metal electrodes 29, 30. The third embodiment thus operates without the roller core 22 as well as without support elements 38. Also here reference is made to the description of FIGS. 4 and 5 with respect to additional features and advantages.

Figure 9:
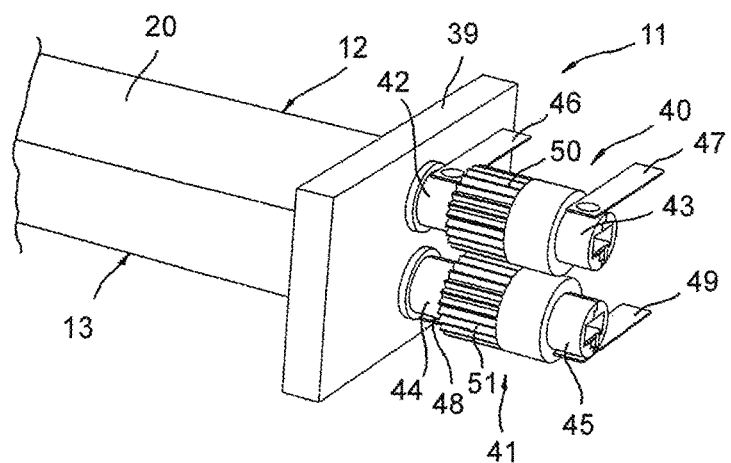
FIG. 9 illustrates a slanted view of a head end of a laminating unit with the laminating roller according to FIG. 3

FIG. 9 illustrates the head end of the laminating unit 11 with the laminating rollers 12, 13. The laminating rollers 12, 13 are rotatably supported in a head plate 39 which is supported in laminator 1. A corresponding support is provided at another end of the laminating unit 11 that is not illustrated herein. The laminating rollers 12, 13 extend into contact sections 40, 41 which respectively include two spatially separated cylindrical contact rings 42, 43 for the laminating roller 12 and contact rings 44, 45 for the laminating roller 13. A slip contact tab 46, 47, 48, 49 respectively contacts the contact rings 42-45 wherein the slip contacts are connected with an electrical power contact supply. Through the slip contacts tabs 46, 47, 48, 49 electrical current is conducted to the contact rings 42, 43, 44, 45. The contact rings 42, 43 are connected with the metal electrodes 29, 30 in the laminating roller 12 and the contact rings 44, 45 are connected with the metal electrodes of the PTC heating rod 27a in the laminating roller 13 so that the PTC heating rods 27a are heated to a temperature of 140° C. to 145 ° C. during operation.

Between the pair of contact rings 42, 43 or 44, 45 respectively associated with a contact section 40, 41 a respective radial tooth gear 50, 51 is arranged. The radial tooth gears are connected torque proof with the laminating rollers 12, 13 and mesh with each other. Through one of the two gears 50, 51 an engagement with the non-illustrated drive sprocket of an electric motor is provided through which the two laminating rollers 12, 13 are driven when the laminator 1 is being operated.

REFERENCE NUMERALS AND DESIGNATIONS 1 laminator
2 housing
3 housing base
4 front wall
5 rear wall
6 upper wall
7 cooling slot
8 pass through channel
9 feed opening
10 outlet opening
11 laminating unit
12 laminating roller
13 laminating roller
14 laminating gap
15 sheet support
16 top side of sheet support
17 support bar
18 support bar
19 roller element
20 roller cover
21 roller tube
22 roller core
23 receiving channel
24 separation gap
25 roller core section
26 roller core section
27 rod shaped heating module
27a heating rod
27b foil
28 PTC heating element
29 metal electrode
30 metal electrode
31 longitudinal edge of PTC heating rod
32 longitudinal edge of PTC heating rod
33 longitudinal edge of PTC heating rod
34 longitudinal edge of PTC heating rod
35 pass through opening
36 inner surface of roller tube
37 portion of metal electrodes 29, 30
38 support element
39 head plate
40 contact section
41 contact section
42 contact ring for laminating roller 12
43 contact ring for laminating roller 12
44 contact ring for laminating roller 13
45 contact ring for laminating roller 13
46 slip contact tab
47 slip contact tab
48 slip contact tab
49 slip contact tab
50 radial tooth gear
51 radial tooth gear

What is claimed is:

1. A heatable roller for laminators, the heatable roller comprising:
a roller body including a cylindrical outer surface and defining a longitudinal axis;
an elastic roller cover which is supported at the outer surface of the roller body;
and
a rod-shaped heating module which is arranged in a central axial pass-through opening of the roller body and which is connected with the roller body, torque-proof,
wherein the roller body includes a cylindrical roller tube which defines the central axial pass-through opening in which the rod-shaped heating module is arranged,
wherein the rod-shaped heating module includes a PTC heating rod which is enveloped by a heat-conducting electrically insulating foil,
wherein the PTC heating rod includes a plurality of cuboid PTC heating elements that are arranged behind one another along the longitudinal axis and which are enveloped on both longitudinal sides by metal electrodes,
wherein the metal electrodes have a trapezoid cross section so that the PTC heating rod is essentially shaped overall as a cuboid whose longitudinal edges are beveled and contact an inner surface of the roller tube.

2. The heatable roller according to claim 1,
wherein free spaces are formed between the metal electrodes and an inner surface of the roller tube, and
wherein the free spaces are respectively completely filled by a circular segment shaped support element made from steel, aluminum, copper or alloys thereof.

* * * * *